(12) United States Patent
Choi et al.

(10) Patent No.: US 12,417,039 B2
(45) Date of Patent: Sep. 16, 2025

(54) CONTROLLER, DATA STORAGE SYSTEM AND COMPUTING SYSTEM

(71) Applicant: SK hynix Inc., Icheon-si (KR)

(72) Inventors: Jung Min Choi, Icheon-si (KR); Hyun Chul Kim, Icheon-si (KR); Byung Il Koh, Icheon-si (KR); Sun Woong Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 12 days.

(21) Appl. No.: 18/599,668

(22) Filed: Mar. 8, 2024

(65) Prior Publication Data
US 2025/0130727 A1  Apr. 24, 2025

(30) Foreign Application Priority Data
Oct. 24, 2023 (KR) .................. 10-2023-0142541

(51) Int. Cl.
*G06F 3/06* (2006.01)
(52) U.S. Cl.
CPC .......... *G06F 3/0631* (2013.01); *G06F 3/0604* (2013.01); *G06F 3/0634* (2013.01); *G06F 3/0683* (2013.01)

(58) Field of Classification Search
CPC .... G06F 3/0631; G06F 3/0604; G06F 3/0634; G06F 3/0683
See application file for complete search history.

(56) References Cited

U.S. PATENT DOCUMENTS

| 6,675,268 B1* | 1/2004 | DeKoning | ............ G06F 3/0622 |
| | | | 710/240 |
| 6,718,371 B1* | 4/2004 | Lowry | .................... G06F 9/542 |
| | | | 709/201 |
| 2022/0342573 A1* | 10/2022 | Cai | ......................... G06F 9/544 |

FOREIGN PATENT DOCUMENTS

| JP | 2018073318 A | 5/2018 |
| KR | 20190013086 A | 2/2019 |

\* cited by examiner

*Primary Examiner* — Khoa D Doan
(74) *Attorney, Agent, or Firm* — Perkins Coie LLP

(57) ABSTRACT

An embodiment of the disclosed technology reduces direct data transmission and reception between a plurality of host devices and enables data sharing by a data storage device, through management of allocation information and access mode information of memory regions included in the data storage device used by the plurality of host devices, thereby improving data processing performance by the plurality of host devices and the use efficiency of the data storage device.

20 Claims, 11 Drawing Sheets

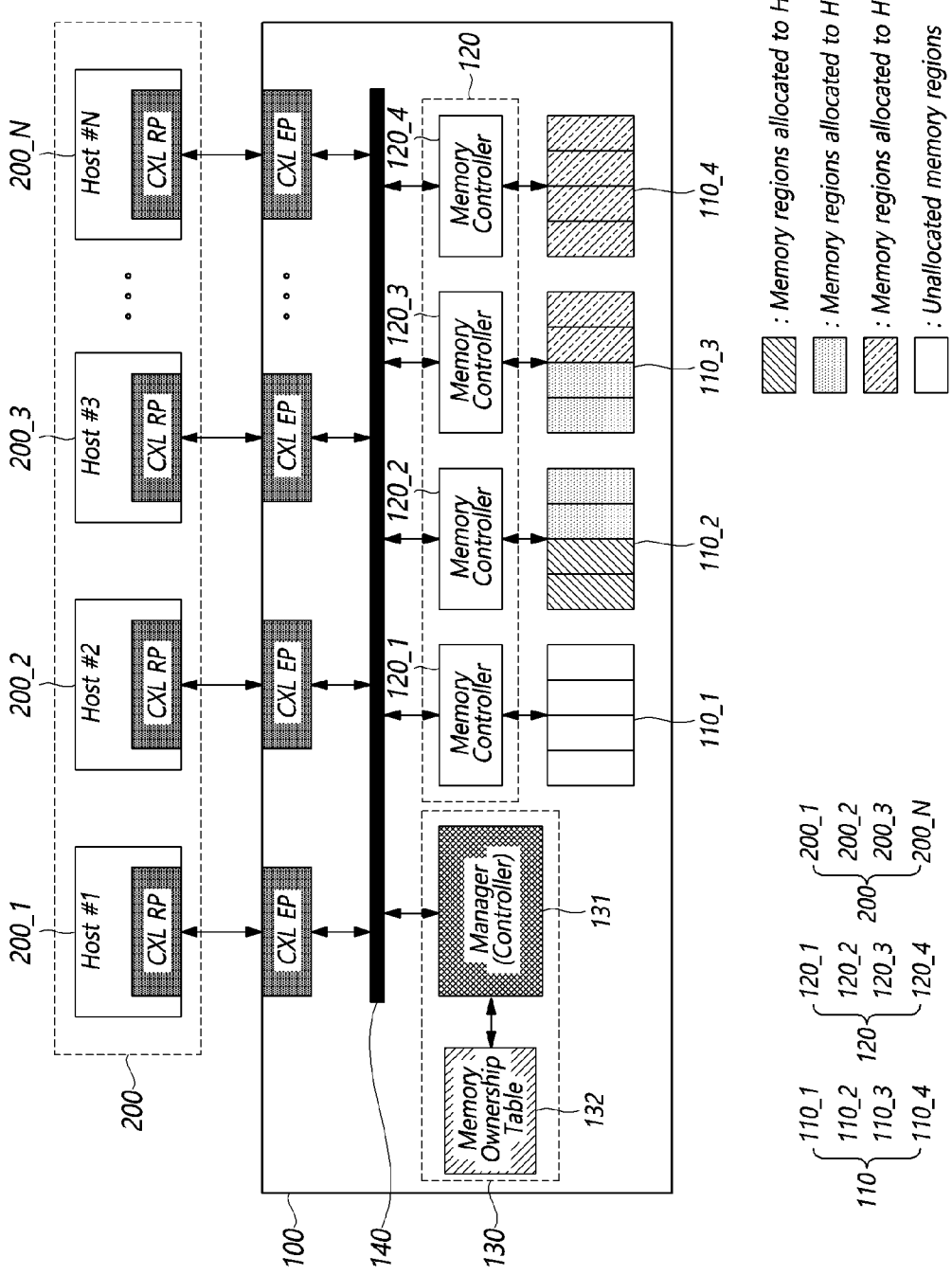

CONTROLLER, DATA STORAGE SYSTEM AND COMPUTING SYSTEM

CROSS-REFERENCE TO RELATED APPLICATION

This patent document claims the priority and benefits of Korean Patent Application No. 10-2023-0142541 filed on Oct. 24, 2023, which is incorporated herein by reference in its entirety.

TECHNICAL FIELD

Various embodiments of the disclosed technology generally relate to controllers, data storage systems and computing systems.

BACKGROUND

A computing system may include a host device and a data storage device used by the host device.

In some cases, the computing system may include more than one host device. In such cases, tasks by the computing system may be distributed and processed by a plurality of host devices to improve the processing speed of the tasks.

As tasks are distributed and processed by a plurality of host devices, the amount of data transmitted and received between the plurality of host devices may increase. This may cause delays and reduce the effectiveness of improving the processing speed of the computing system.

SUMMARY

Various embodiments of the disclosed technology are directed to providing a computing system capable of improving the performance of distributedly processing a work by a plurality of host devices, and a data storage device capable of being used therefor.

In an embodiment, a data storage system may include: one or more memory devices, each memory device including a plurality of memory regions; and a controller coupled in communication with the one or more memory devices and configured to control at least one of the one or more memory devices, wherein the controller is configured to: set an access mode for a first memory region of the plurality of memory regions; allocate the first memory region of the plurality of memory regions as a shared memory region to be accessed by, and in response to allocation requests of, a plurality of host devices that are outside the data storage system; change the access mode of the first memory region allocated as the shared memory region in response to an access mode change request from a first host device among the plurality of host devices, and allocate the shared memory region to a second host device that is among the plurality of host devices and is different from the first host device.

In an embodiment, a controller unit for data storage in one or more memory devices may include: an auxiliary memory configured to store allocation information and access mode information associated with a plurality of memory regions included in at least one memory device; and a controller configured to: change, in response to an access mode change request from a first host device outside the memory device in accessing the memory device, an access mode of a first memory region of the plurality of memory regions that is allocated to the first host device from a first mode to a second mode; and change, in response to a deallocation request from a second host device different from the first host device, the access mode of the first memory region from the second mode to the first mode.

In an embodiment, a computing system may include: a first host device; a second host device; and a data storage device structured to include memory regions for storing data and configured to be in communication with the first host device and second host device so that the first host device and the second host device can access the data storage device, wherein the first host device is configured to: transmit an allocation request to the data storage device; write data to a shared memory region allocated according to the allocation request; and transmit an access mode change request for changing an access mode of the shared memory region to the data storage device, and wherein the data storage device changes the access mode of the shared memory region from a first mode to a second mode in response to the access mode change request, and allocates the shared memory region to the second host device.

In an embodiment, a data storage system may include: one or more memory devices, each memory device including a plurality of memory regions; and a controller coupled in communication with the one or more memory devices and configured to control at least one of the one or more memory devices, wherein the controller is configured to: set an access mode for a first memory region of the plurality of memory regions; allocate the first memory region of the plurality of memory regions as a shared memory region to be accessed by, and in response to allocation requests of, a plurality of host devices that are outside the data storage system; change the access mode of the first memory region allocated as the shared memory region from a first mode to a second mode in response to an access mode change request from a first host device among the plurality of host devices for the access mode of the shared memory region; and change the access mode of the first memory region allocated as the shared memory region from the second mode to the first mode in response to a deallocation request from a second host device that is among the plurality of host devices and is different from the first host device.

In an embodiment, a data storage system may include: at least one memory device including a plurality of memory regions; and a controller configured to control the at least one memory device, wherein the controller sets an access mode for each of the plurality of memory regions, allocates a first memory region among the plurality of memory regions as a shared memory region in response to allocation requests of a plurality of host devices, changes the access mode of the shared memory region from a first mode to a second mode in response to an access mode change request of a first host device among the plurality of host devices for the access mode of the shared memory region, and changes the access mode of the shared memory region from the second mode to the first mode in response to a deallocation request of a second host device being at least one host device other than the first host device among the plurality of host devices.

In an embodiment, a controller unit may include: an auxiliary memory configured to store allocation information and access mode information of a plurality of memory regions included in at least one memory device; and a controller configured to change, according to an access mode change request of a first host device, an access mode of a first memory region allocated to the first host device from a first mode to a second mode, and change, on the basis of a deallocation request of a second host device being at least one host device other than the first host device, the access mode of the first memory region from the second mode to the first mode.

In an embodiment, a computing system may include: a first host device; a second host device; and a data storage device used by the first host device and the second host device, wherein the first host device transmits an allocation request to the data storage device, writes data to a shared memory region allocated according to the allocation request, and transmits an access mode change request for changing an access mode of the shared memory region to the data storage device, and wherein the data storage device changes the access mode of the shared memory region from a first mode to a second mode according to the access mode change request, and allocates the shared memory region to the second host device.

In some embodiments of the disclosed technology, the performance of distributedly processing a work by a plurality of host devices may be improved, and the use efficiency of a data storage device used by the plurality of host devices may be improved.

BRIEF DESCRIPTION OF THE DRAWINGS

FIG. 1 is a diagram illustrating an example of a computing system and a data storage device based on an embodiment of the disclosed technology.

DETAILED DESCRIPTION

Figure 2A:
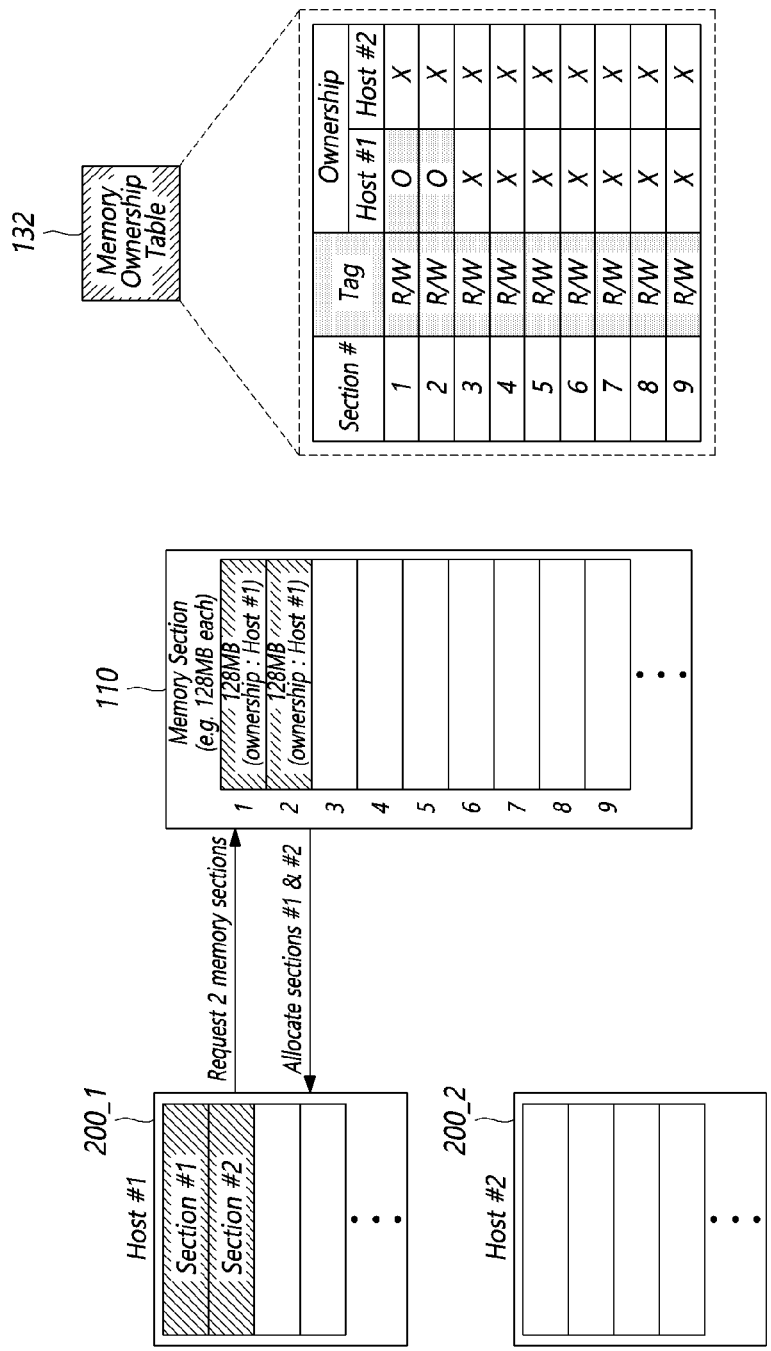
FIGS. 2A to 2C are diagrams illustrating an example method of allocating and deallocating memory regions included in the data storage device based on an embodiment of the disclosed technology.

In the following description of examples or embodiments of the present disclosure, reference will be made to the accompanying drawings in which it is shown by way of illustration specific examples or embodiments that can be implemented FIG. 1 is a diagram illustrating an example configuration of a computing system and a data storage device 100 based on an embodiment of the disclosed technology.

Referring to FIG. 1, the computing system based on an embodiment of the disclosed technology may include the data storage device 100 and a host system that are coupled to communicate with each other to enable the host system to access the memory devices in the data storage device 100.

The host system in the computing system may include, for example, a plurality of host devices 200 that are coupled in communication with the data storage device 100, and FIG. 1 illustrates as an example of an implementation where the computing system includes N number of host devices 200_1, 200_2, 200_3, ..., 200_N, wherein N is a positive integer. The N number of host devices 200_1, 200_2, 200_3, ..., 200_N may be part of the host system. The host system may include a host management server which controls the N host devices 200_1, 200_2, 200_3, ..., 200_N within the host system.

In some implementations, each host device 200 (200_1, 200_2, 200_3, ..., 200_N) may be a computer, an ultra mobile personal computer (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a data storage of a data center, electronic devices of a home network, electronic devices of a telematics network, a radio frequency identification (RFID) device, a mobility device (e.g., a vehicle, a robot or a drone) capable of operating under human control or autonomous driving, or others. In some implementations, the host device 200 may be a virtual/augmented reality device which provides a 2D or 3D virtual reality image or augmented reality image. The host device 200 is not limited to the above examples, and may be any one of various electronic devices that require the data storage device 100 capable of storing data.

The host device 200 may include at least one operating system. The operating system may manage and control overall functions and operations of the host device 200. The operating system may control operations that are performed between the host device 200 and the data storage device 100. The operating system may be classified into a general operating system and a mobile operating system depending on the mobility of the host device 200.

The host device 200 may perform data processing using a memory included in the host device 200. The host device 200 may also perform data processing using the data storage device 100 located outside the host device 200.

The host device 200 may perform a communication between the host devices 200 and the data storage device 100 through a preset interface.

In some implementations, the host device 200 may communicate with the data storage device 100 through the Compute Express Link (CXL) interface. The host device 200 may be set as a CXL root port, and the data storage device 100 may be set as a CXL end point. Since the host device 200 communicates with the data storage device 100 through the CXL interface, a low-latency, high-bandwidth access environment may be implemented in a structure that communicates with a high-capacity data storage device 100.

In some implementations, the host device 200 may communicate with the data storage device 100 through an interface other than the CXL interface.

For example, the host device 200 and the data storage device 100 may communicate through at least one of interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol and an integrated drive electronics (IDE) protocol, but the disclosed technology is not limited thereto.

The type and number of host devices 200 that communicate with the data storage device 100 based on an embodiment of the disclosed technology and a communication interface between the host device 200 and the data storage device 100 may vary, but hereinafter, a case where two or more host devices 200 communicate with the data storage device 100 through the CXL interface will be described as an example.

The data storage device 100 may include at least one memory device 110. FIG. 1 illustrates as an example a case where the data storage device 100 includes four memory devices 110_1, 110_2, 110_3 and 110_4. In some implementations, the term "data storage system" may also be used to indicate a data storage device such as the data storage device 100.

The memory device 110 may be, for example, a volatile memory device such as a DRAM, an SDRAM, a DDR SDRAM and an LPDDR SDRAM, but the disclosed technology is not limited thereto. In some implementations, the memory device 110 may be a nonvolatile memory device. In some implementations, some of the plurality of memory devices 110 may be volatile memory devices, and the other may be nonvolatile memory devices. In some embodiments, only one memory device 110 is included in the data storage device 100.

The data storage device 100 may include a memory controller 120 which is coupled between the host system (host devices 200) and the memory device 110 and controls the operation of the memory device 110 in connection with one or more requests from the host system. FIG. 1 illustrates, as an example, an implementation of a memory controller 120 that includes four memory controllers 120_1, 120_2, 120_3 and 120_4 which are in communication with the host system and the four memory devices 110_1, 110_2, 110_3 and 110_4 and are configured to control the four memory devices 110_1, 110_2, 110_3 and 110_4, respectively. In some implementations, one memory controller 120 may control the operations of at least two memory devices 110.

The memory controller 120 may control writing, reading, and erasing operations that are performed on the memory device 110 in response to a command from the outside such as.

Separate from the memory controller 120 (four memory controllers 120_1, 120_2, 120_3 and 120_4), the data storage device 100 may include a controller 131 which manages or controls operations associated with the memory device 110 and the memory controller 120. The data storage device 100 may include an auxiliary memory 132 store data associated with the operation of the controller 131. The auxiliary memory 132 may be, for example, a volatile memory device such as an SRAM, but the disclosed technology is not limited thereto.

The controller 131 and the auxiliary memory 132 may constitute a controller unit 130.

The controller 131 and the auxiliary memory 132 may be included in the data storage device 100 as separate components or may be incorporated into a single component in the data storage device. In some implementations, the controller 131 and the auxiliary memory 132 may be implemented as chiplets, respectively, and may be packaged together. In this case, the controller unit 130 may be provided in the form of a single package.

In some implementations, the controller 131 and the memory controller 120 may be disposed separately. In some implementations, the controller 131 and the memory controller 120 may be incorporated into a single component. In some implementations, some functions of the memory controller 120 may be implemented in the controller 131.

The controller 131 and the memory controller 120 may communicate through a bus 140. In some implementations, signals to be received from the host device 200 or signals to be transmitted to the host device 200 may be carried by the bus 140.

The controller 131 may allocate or deallocate a memory region (or a memory section) included in the memory device 110 according to a request of the host device 200.

FIG. 1 illustrates an example in which the memory regions of the four memory devices 110_1, 110_2, 110_3 and 110_4 included in the data storage device 100 are allocated to the host device 200.

The memory regions of the first memory device 110_1 may be memory regions that are not allocated to the host device 200. Some memory regions of the second memory device 110_2 may be allocated to the first host device 200_1 and other memory regions may be allocated to the second host device 200_2. Some memory regions of the third memory device 110_3 may be allocated to the second host device 200_2 and other memory regions may be allocated to the third host device 200_3. All of the memory regions of the fourth memory device 110_4 may be allocated to the third host device 200_3.

The host device 200 may perform operations or tasks using the memory regions allocated by the controller 131. The controller 131 may manage memory region allocation information using the auxiliary memory 132, and may also manage the access mode of each memory region.

Figure 2B:
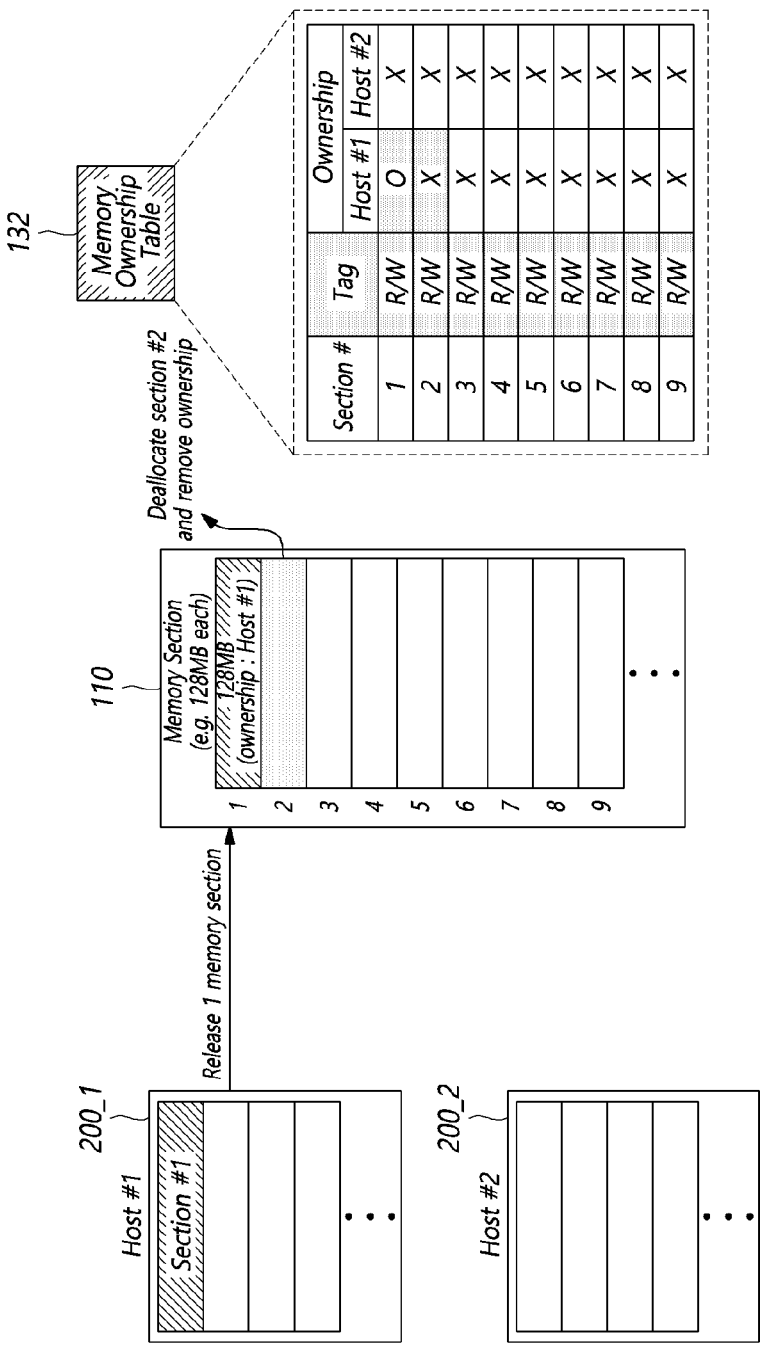
Figure 2C:
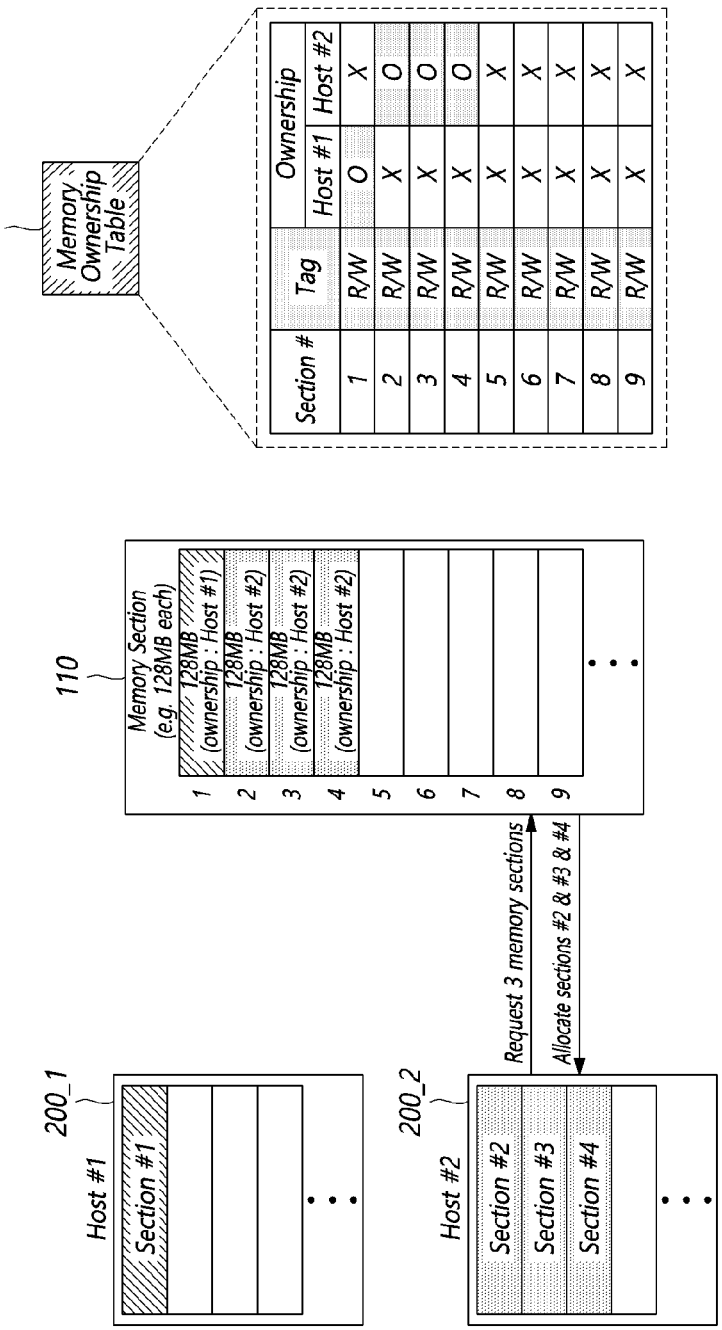

FIGS. 2A to 2C are diagrams illustrating an example method of allocating and deallocating memory regions included in the data storage device 100 based on an embodiment of the disclosed technology. FIGS. 2A to 2C illustrate an example in which the memory regions of the plurality of memory devices 110 included in the data storage device 100 are incorporated.

Referring to FIG. 2A, the controller 131 of the data storage device 100 may allocate memory regions #1 and #2 of the memory regions included in the memory device 110 to the first host device 200_1 in response to an allocation request of the first host device 200_1.

The controller 131 may store and manage memory region allocation information in the auxiliary memory 132. The controller 131 may manage the access mode of an allocated memory region by a tag.

For example, the controller 131 may set the access mode of an allocated memory region to a mode that allows read and write operations. In some implementations, the access mode that allows read and write operations may be referred to as a first mode. The controller 131 may set the access mode of an allocated memory region to a mode that allows read operations only. In some implementations, the access mode that allows read operations only may be referred to as a second mode.

In some implementations, the controller 131 may set the access mode of a memory region in various ways. The controller 130 may set the use of a memory region allocated to each host device 200 through management of memory region allocation information and access mode information.

The controller 131 may deallocate a memory region in response to a deallocation request of the host device 200.

For example, referring to FIG. 2B, the controller 131 may receive a deallocation request for some memory regions from the first host device 200_1. The first host device 200_1 may request the controller 131 to deallocate one memory region. The controller 131 may deallocate the memory region #2 of the memory regions #1 and #2 allocated to the first host device 200_1.

Upon deallocation of the memory region #2, the controller 131 may update allocation information on the memory region #2 in the memory region allocation information stored in the auxiliary memory 132. In some implementations, when a memory region is deallocated, the access mode of the corresponding memory region may be set to the first mode, which is a default mode. In some implementations, these operations may be performed without receiving access mode information for an unallocated memory region.

The controller 131 may allocate a memory region according to an allocation request of another host device 200.

For example, referring to FIG. 2C, in a state in which the memory region #2 is deallocated, the controller 131 may receive an allocation request of the second host device 200_2. The second host device 200_2 may transmit an allocation request for three memory regions to the controller 131.

According to the allocation request of the second host device 200_2, the controller 131 may allocate three memory regions #2, #3 and #4. The controller 131 may indicate, in the allocation information stored in the auxiliary memory 132, that the memory regions #2, #3 and #4 are allocated to the second host device 200_2. The access modes of the allocated memory regions #2, #3 and #4 may be set to the first mode in which read and write are possible.

In this way, the controller 131 may manage the allocation, deallocation and access modes of the memory regions included in the memory device 110, and may enable the host device 200 to perform operations and tasks using the memory regions included in the memory device 110. Through management of the access mode of a memory region, the controller 131 may ensure that only a specific host device 200 can use the memory region or at least two host devices 200 can share and use the memory region.

Through management of an access mode by the controller 131, the host device 200 and the data storage device 100 may perform operations and tasks more efficiently.

FIGS. 3 to 7 are diagrams illustrating an example method of using memory regions included in a data storage device 100 implemented based on an embodiment of the disclosed technology as shared memory regions to be shared and accessed by different host devices.

Figure 3:
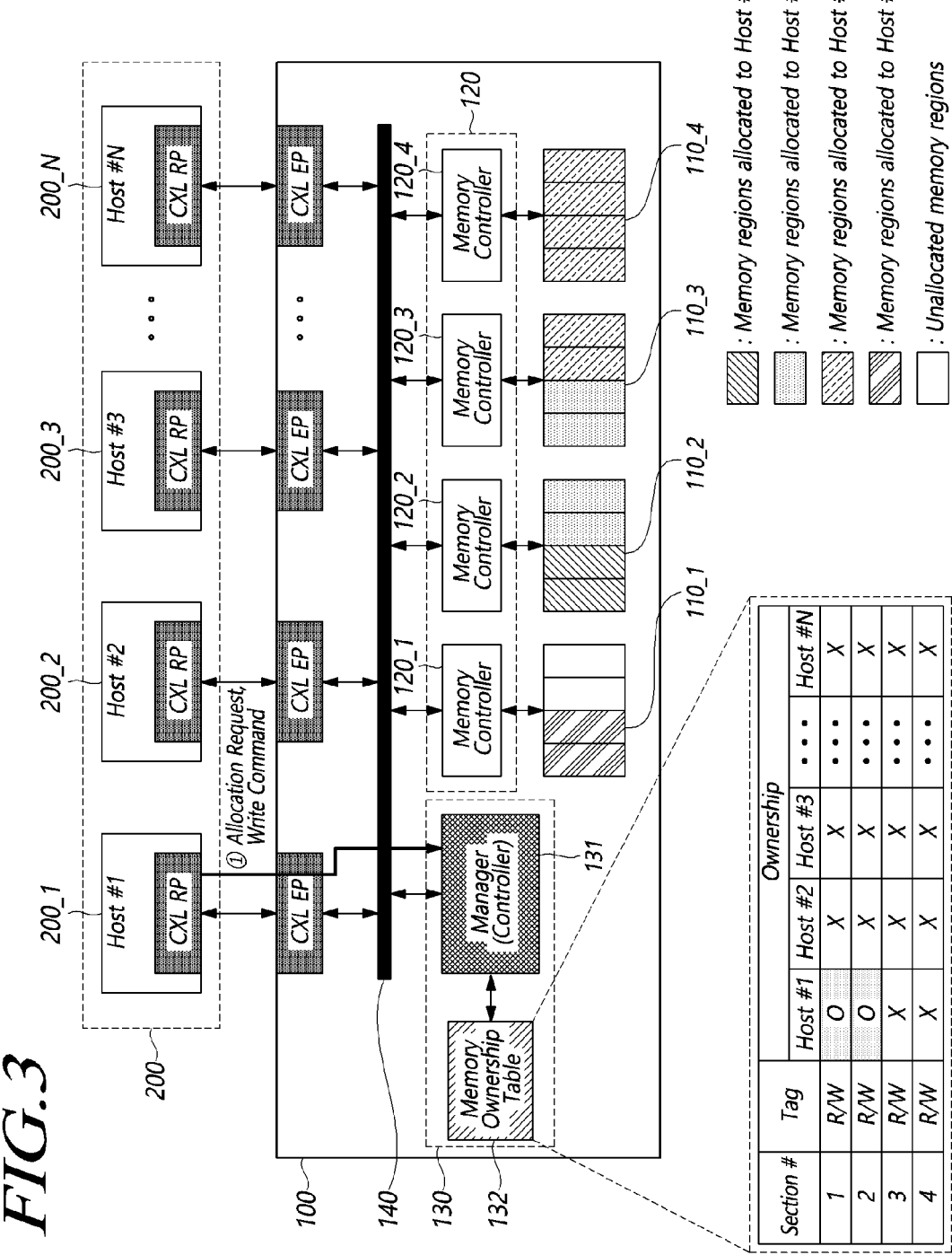
FIGS. 3 to 7 are diagrams illustrating an example method of using memory regions included in a data storage device implemented based on an embodiment of the disclosed technology as shared memory regions.

Referring to FIG. 3, a host system may include N host devices 200_1, 200_2, 200_3, . . . , 200_N.

The N host devices 200_1, 200_2, 200_3, . . . , 200_N included in the host system may each perform a separate work or may distributedly perform the same work.

The N host devices 200_1, 200_2, 200_3, . . . , 200_N may perform data processing using a data storage device 100 in addition to memory devices included in the respective host devices 200.

The data storage device 100 may include at least one memory device 110 and a memory controller 120 to control the operation of the at least one memory device 110.

The data storage device 100 may include a controller 131 to control or manage allocation and deallocation of the memory regions of the memory device 110. The controller 131 may maintain or manage information on the memory regions using an auxiliary memory 132.

The controller 131 may allocate the memory regions included in the memory device 110 according to an allocation request of the host device 200. FIG. 3 illustrates as an example where the memory regions included in a second memory device 110_2, a third memory device 110_3 and a fourth memory device 110_4 are allocated to a first host device 200_1, a second host device 200_2 and a third memory device 200_3.

The above-described memory regions may be memory regions that are used only by the respective host devices 200. In some implementations, some memory regions may be set as shared memory regions that may be accessed by different host devices.

In some implementations, the access mode of a memory region used only by a specific host device 200 and the access mode of a memory region used as a shared memory region may be different from each other. In some implementations, even in a memory region used as a shared memory region, the allocation and access mode of the memory region may be modified depending on an operation for the corresponding memory region.

A method of setting a shared memory region may be performed similarly to a method of allocating a memory region.

For example, an allocation request by the first host device 200_1 may be transmitted to the controller 131 (①).

The controller 131 may allocate memory regions #1 and #2 of the four memory regions included in a first memory device 110_1 to the first host device 200_1.

The controller 131 may manage allocation information of the memory regions #1 and #2 through a table stored in the auxiliary memory 132. The controller 131 may set the access modes of the memory regions #1 and #2 to the first mode in which read and write are possible.

The controller 131 may receive a write command from the first host device 200_1. According to the write command, while a first memory controller 120_1 controls the first memory device 110_1, data may be written to the memory regions #1 and #2 of the first memory device 110_1.

Similar to the method of allocating a memory region to the first host device 200_1, a memory region that is included in the first memory device 110_1 and is to be used as a shared memory region may be allocated to the first host device 200_1.

The controller 131 may receive a request for changing the access mode of a memory region, from a host device 200 that requests setting of a shared memory region.

Figure 4:
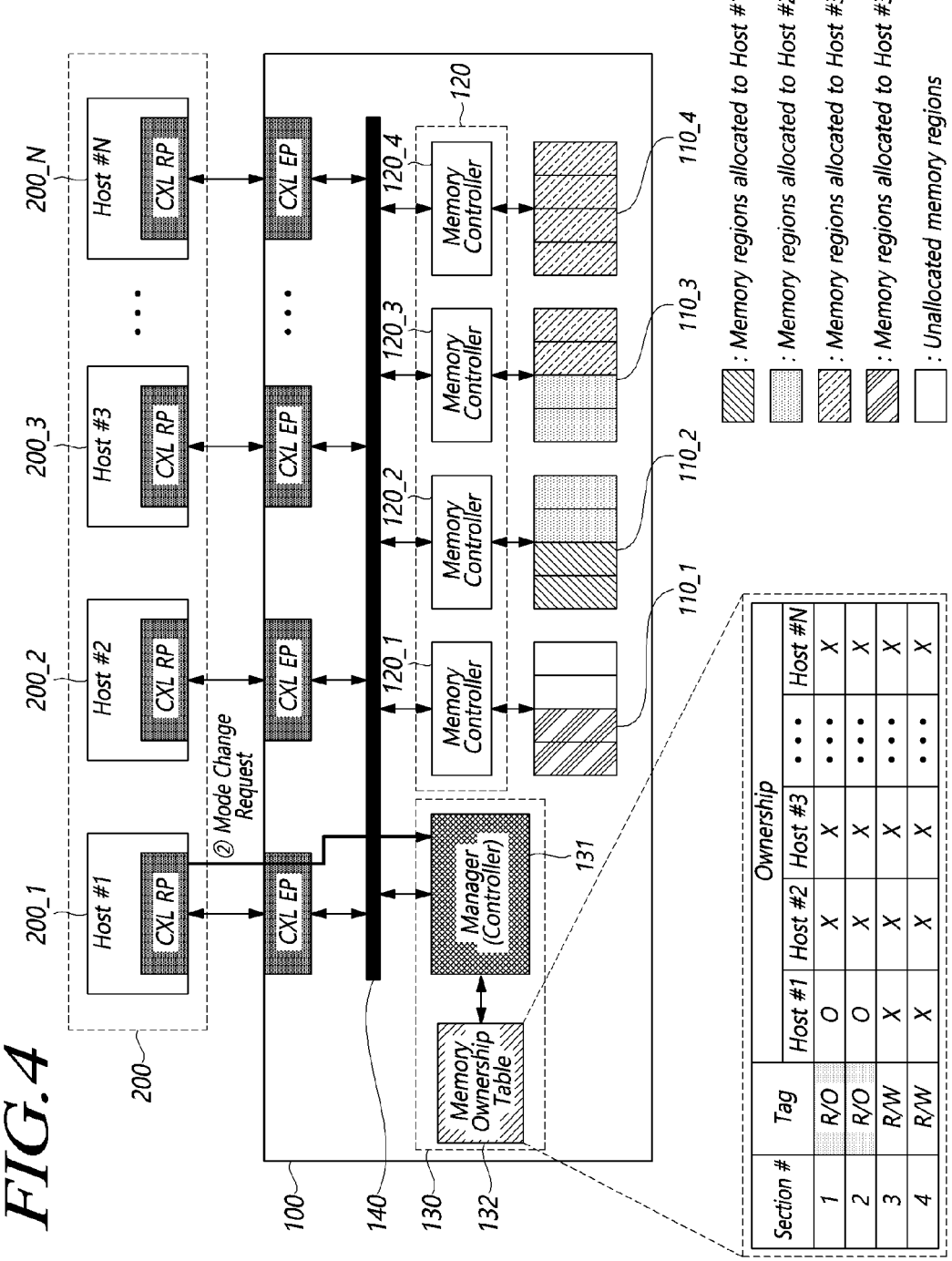

For example, referring to FIG. 4, the controller 131 may receive a mode change request (e.g., referred to as "access mode change request") from the first host device 200_1 (②). The first host device 200_1 may transmit, to the controller 131, a request for changing the access modes of the memory regions #1 and #2 allocated from the first memory device 110_1.

When receiving the mode change request from the first host device 200_1, the controller 131 may change the access modes of the corresponding memory regions #1 and #2 according to the mode change request. The controller 131 may set the access modes of the memory regions #1 and #2 included in the first memory device 110_1 to the second mode, which allows read operations only.

According to the mode change request of the first host device 200_1, the controller 131 may update the table stored in the auxiliary memory 132.

In this way, in a state in which a memory region set to the first mode that allows read and write operations is allocated, the access mode of the memory region may be changed according to a mode change request of the host device 200. According to the change in the access mode of the memory region, a shared memory region, which may be accessed by another host device 200, may be set or allocated.

In some implementations, when the host device 200 transmits an allocation request to the data storage device 100, the host device 200 may request allocation of a shared memory region. In this case, the controller 131 may maintain the access mode of an allocated memory region in the first mode until data writing of the corresponding host device 200 is completed, and when the data writing is completed, the controller 131 may change the access mode of the corresponding memory region to the second mode that allows read operations only. In some implementations, a data write request may be included in a mode change request, and in this case, when data writing corresponding to the data write request is completed, an access mode change may be performed.

Through access mode management by the controller 131, a host device 200 other than the host device 200 that has written data to a memory region may become able to access the corresponding memory region.

The first host device 200_1 may transmit the mode change request and transmit reader node information to the controller 131.

The reader node information may include information on a host device 200 that may access a memory region set as a shared memory region by the first host device 200_1. The first host device 200_1, which writes data to the shared memory region, may be referred to as a writer host, and the host device 200, which is authorized to read data of the corresponding memory region, may be referred to as a reader node.

When receiving the mode change request and the reader node information from the first host device 200_1, the controller 131 may change the access mode and allocation information of the shared memory region allocated to the first host device 200_1.

Figure 5:
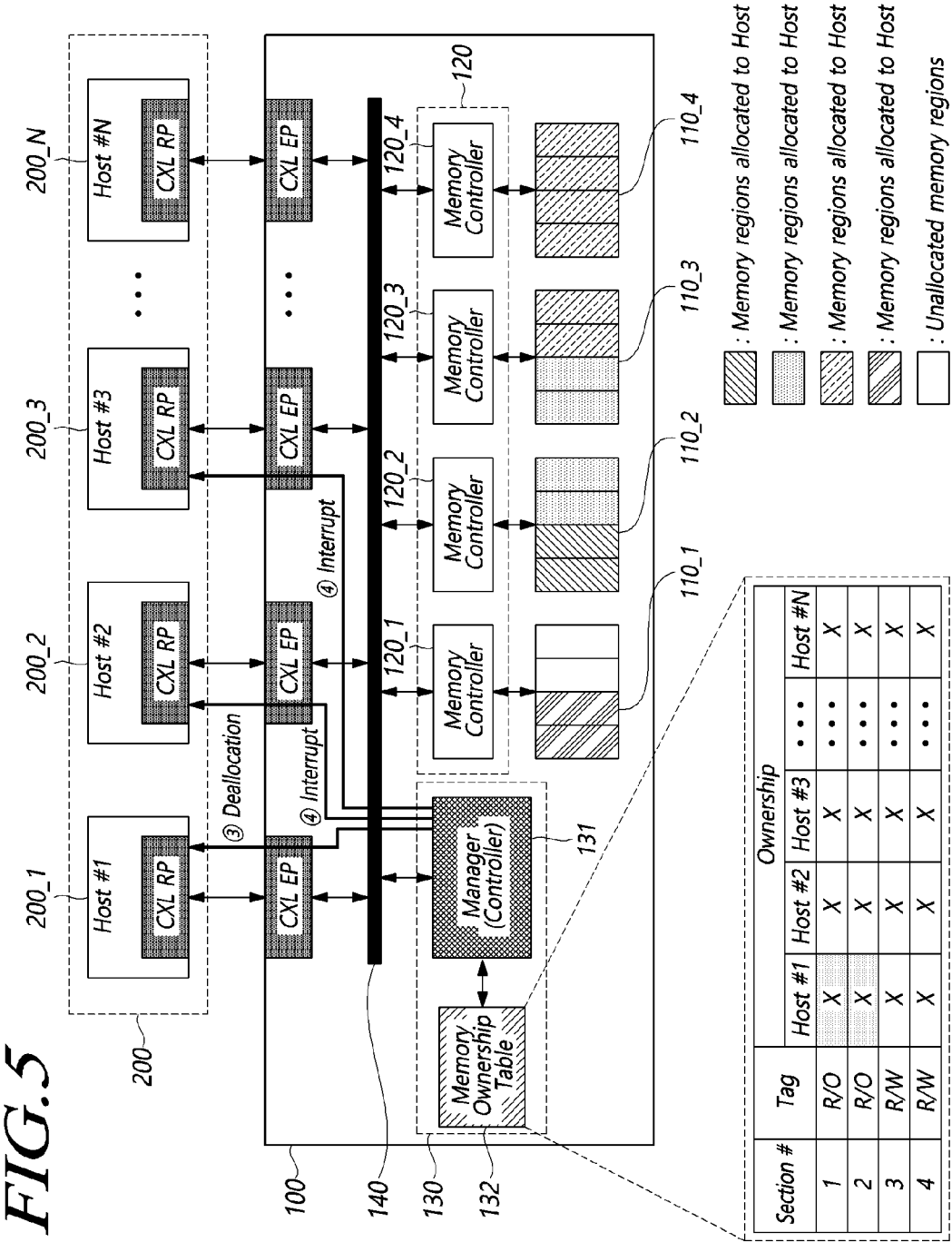

In some implementations, referring to FIG. 5, according to the mode change request of the first host device 200_1, the controller 131 may change the access modes of the memory regions #1 and #2 of the first memory device 110_1, and may change the allocation information of the memory regions #1 and #2. The controller 131 may deallocate the memory regions #1 and #2 of the first memory device 110_1 for the first host device 200_1 (③).

In some implementations, when receiving a deallocation request from the first host device 200_1, the controller 131 may deallocate the memory regions #1 and #2 of the first memory device 110_1 for the first host device 200_1. In this case, the time point at which the memory regions #1 and #2 of the first memory device 110_1 for the first host device 200_1 are deallocated may be any time point after data writing to the memory regions #1 and #2 by the first host device 200_1 is completed.

When deallocating the memory regions #1 and #2 of the first memory device 110_1 for the first host device 200_1, the controller 131 may update the table stored in the auxiliary memory 132 according to the deallocation. In some implementations, the controller 131 may transmit a deallocation signal to the first host device 200_1.

200 In some implementations, the controller 131 may transmit an interrupt signal to at least one host device 200 other than the first host device 200_1, based on the reader node information received from the first host device 200_1. The interrupt signal may be a signal notifying a qualification to access the shared memory region. The host device 200 receiving the interrupt signal may be request an allocation the shared memory region to the data storage device 100. The interrupt signal may be transmitted by the controller 131. In some cases, the interrupt signal or a signal corresponding to the interrupt signal may be transmitted by the first host device 200_1 to which the shared memory region is allocated.

The controller 131 may transmit the interrupt signal to a host device 200 included in the reader node information. For example, the controller 131 may transmit the interrupt signal to the second host device 200_2 and the third host device 200_3 (④).

Since the access modes of the memory regions #1 and #2 of the first memory device 110_1, to which the data is written by the first host device 200_1, are changed to the second mode, which allows read operations only and the interrupt signal is transmitted by the controller 131 to the host device 200 included in the reader node information, the host device 200 that requires data sharing due to the first host device 200_1 may acquire the corresponding data through the data storage device 100.

For example, when data transmission related to operations or tasks performed in a distributed manner by the first host device 200_1 together with the second host device 200_2 and the third host device 200_3 is required, the first host device 200_1 may share the corresponding data through memory regions of the data storage device 100.

Since direct data transmission is not required between the first host device 200_1 and other host devices 200, it is possible to prevent or reduce delays due to data transmission and reception between host devices 200.

In addition, since the first host device 200_1, which is the writer host, indicates a reader node through the reader node information, only a host device 200 whose access is required may access the corresponding data.

Figure 6:
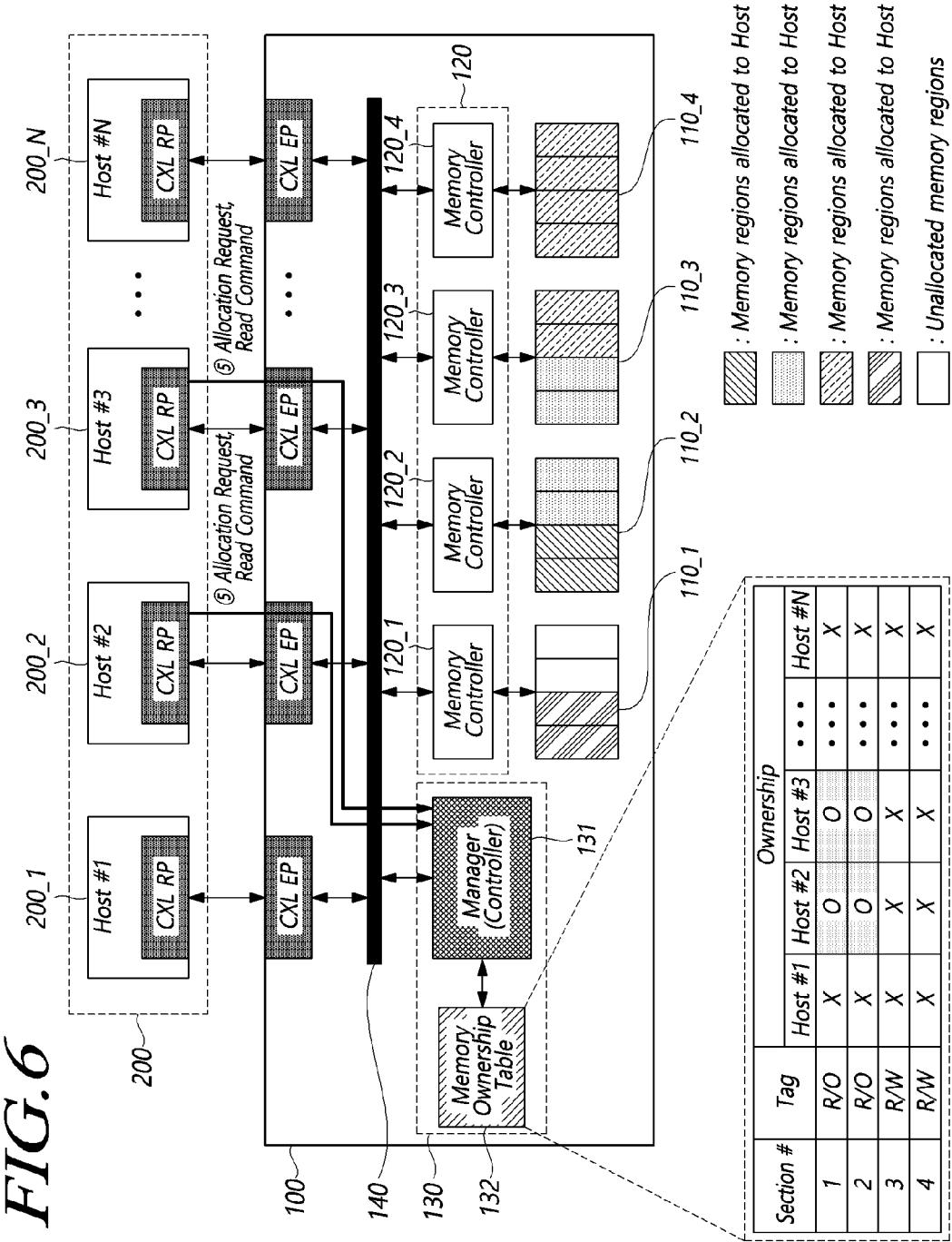

For example, referring to FIG. 6, the second host device 200_2 and the third host device 200_3, which receive the interrupt signals from the controller 131, may transmit allocation requests to the controller 131 (⑤). Furthermore, the second host device 200_2 and the third host device 200_3 may transmit read commands to the controller 131.

When receiving the allocation requests from the second host device 200_2 and the third host device 200_3, the controller 131 may allocate the memory regions #1 and #2 of the first memory device 110_1, which are shared memory regions, to the second host device 200_2 and the third host device 200_3.

In some implementations, the controller 131 may update the table stored in the auxiliary memory 132, and may grant access to the memory regions #1 and #2 of the first memory device 110_1 to the second host device 200_2 and the third host device 200_3.

In some implementations, since it is a state in which the access modes of the memory regions #1 and #2 are changed to the second mode, the controller 131 may transmit interrupt signals and allocate the memory regions #1 and #2 to host devices 200 included in the reader node information. The host devices 200 included in the reader node information may directly transmit read commands without transmitting allocation requests to the controller 131.

Since it is a state in which the memory regions #1 and #2 of the first memory device 110_1 are set to the second mode, which allows read operations only is possible, the second host device 200_2 and the third host device 200_3 may perform only operations of reading the data stored in the corresponding memory regions #1 and #2 through the read commands.

The disclosed technology may be implemented to reduce or prevent the damage to the data stored in the shared memory regions #1 and #2, and the data may be transferred to the second host device 200_2 and the third host device 200_3 that require data sharing.

In this way, during a period in which the shared memory regions #1 and #2 are set to the first mode and thus data is written to the shared memory regions #1 and #2, the shared memory regions #1 and #2 may be allocated to only one host device 200. During a period in which the shared memory regions #1 and #2 are set to the second mode and thus reading of the data written to the shared memory regions #1 and #2 is performed, it may be a state in which the shared memory regions #1 and #2 are allocated to one or at least two host devices 200.

When the reading operation of the data stored in the shared memory regions #1 and #2 is completed, the second host device 200_2 and the third host device 200_3 corresponding to the reader nodes may request deallocation of the shared memory regions #1 and #2.

Figure 7:
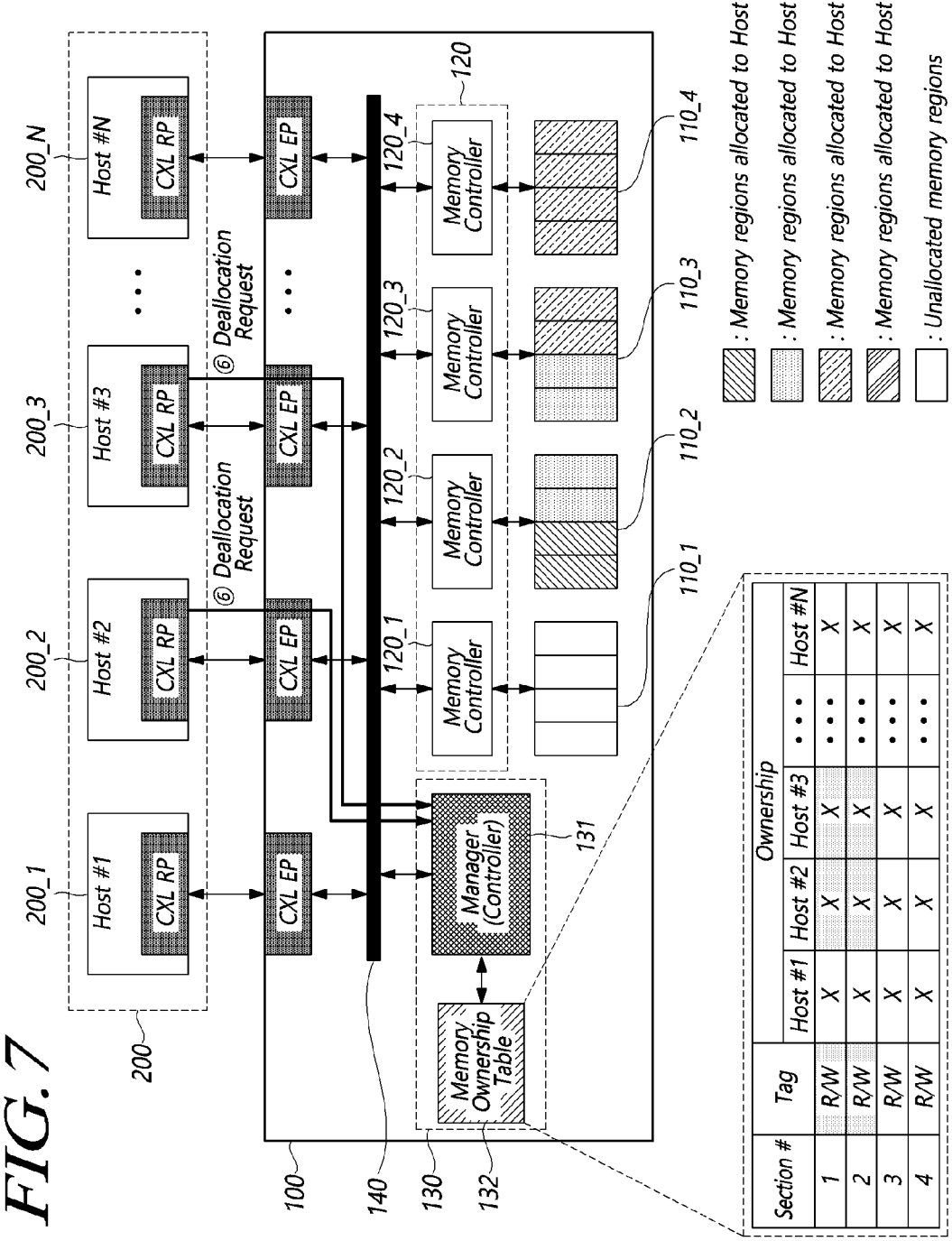

For example, referring to FIG. 7, the second host device 200_2 and the third host device 200_3 may transmit deallocation requests to the controller 131 of the data storage device 100 (⑥).

When receiving deallocation requests, the controller 131 may deallocate memory regions for host devices 200. The controller 131 may deallocate the memory regions #1 and #2 for each of the second host device 200_2 and the third host device 200_3.

When receiving deallocation requests for shared memory regions from all host devices 200 included in reader node information, the controller 131 may change the access modes of the shared memory regions.

For example, when completing deallocation by receiving the allocation request of the second host device 200_2 and the deallocation request of the third host device 200_3 for the memory region #1 of the first memory device 110_1, the controller 131 may change again the access mode of the memory region #1 from the second mode to the first mode. When completing deallocation by receiving the allocation request of the second host device 200_2 and the deallocation request of the third host device 200_3 for the memory region #2 of the first memory device 110_1, the controller 131 may change again the access mode of the memory region #2 from the second mode to the first mode.

After allocation requests by all host devices 200 included in reader node information, when receiving allocation requests by all the host devices 200 included in the reader node information, the controller 131 may change the allocation information and access mode information of shared memory regions.

Allocation of shared memory regions may be performed by a request of a writer host, and deallocation of the shared memory regions may be performed by a request of a reader node. The access modes of the shared memory regions may be changed from the first mode to the second mode by a request of the writer host, and the access modes of the shared memory regions may be changed from the second mode to the first mode by a request of the reader node.

In some implementations, deallocation of shared memory regions for the writer host may be performed by a deallocation request of the writer host.

In this way, when the use of the shared memory regions by all the host devices 200 included in the reader node information is completed, the controller 131 may deallocate the shared memory regions, and may manage the shared memory regions in a state in which the shared memory regions may be reallocated to other host devices 200.

Since the memory regions of the memory device 110 included in the data storage device 100 may be used as shared memory regions through the access mode management with respect to the memory regions, the operational performance of the host device 200 may be improved by reducing data transmitted and received between the plurality of host devices 200, which use the data storage device 100.

In addition, since host devices 200, which are reader nodes capable of accessing shared memory regions, are managed through reader node information by a host device 200, which is a writer host, the stability of the shared memory regions may be maintained.

The controller 131 of the data storage device 100, which receives the reader node information, may transfer information on the shared memory regions to the host devices 200, which are the reader nodes, through interrupt signals. In some implementations, information on the use of the shared memory regions may be directly transmitted to the host devices 200, which are the reader nodes, by the host device 200, which is the writer host.

Information on setting and resetting of the shared memory regions may be managed in various ways.

Figure 8:
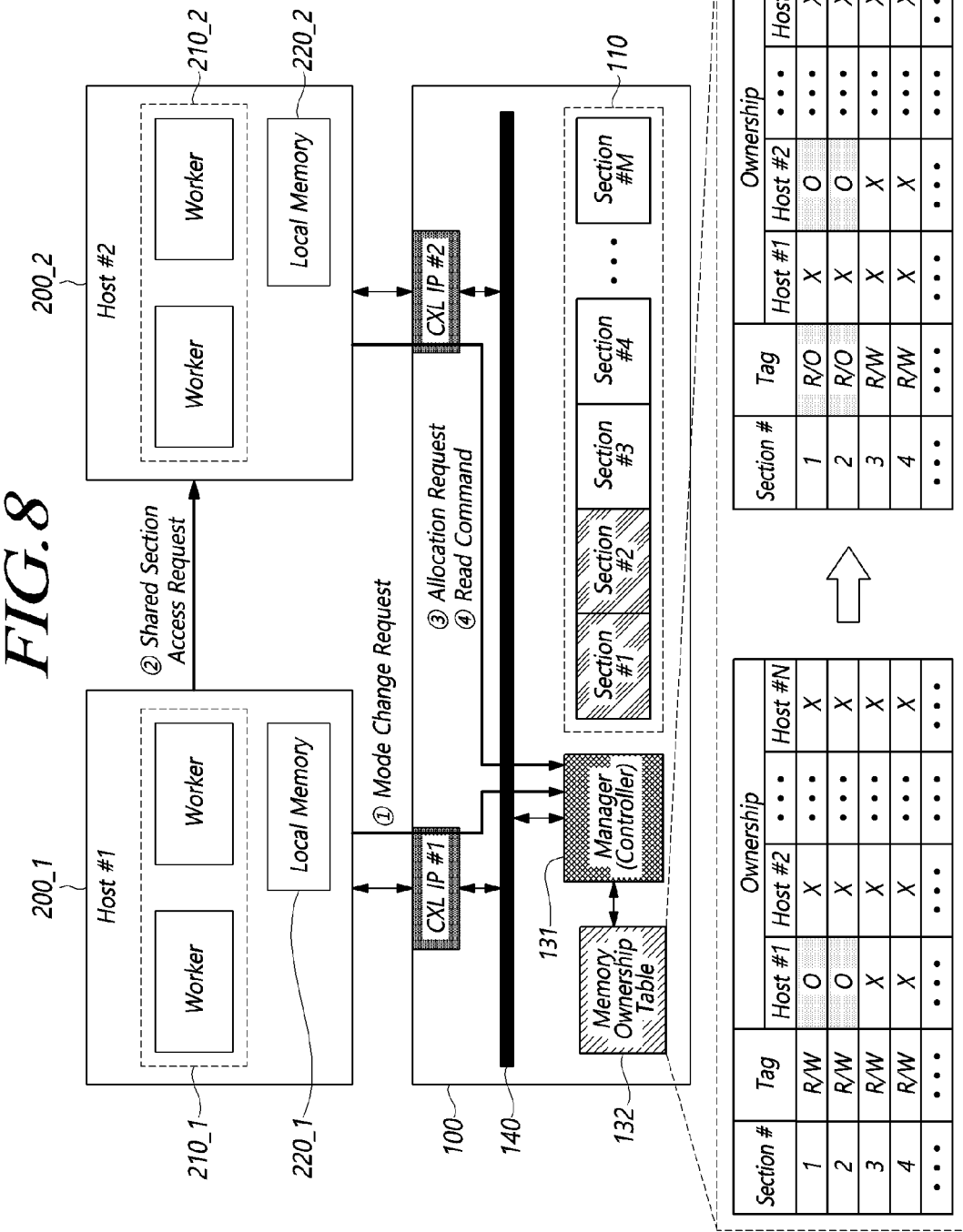
FIGS. 8 and 9 are diagrams illustrating another example method of using memory regions included in a data storage device implemented based on an embodiment of the disclosed technology as shared memory regions.
Figure 9:
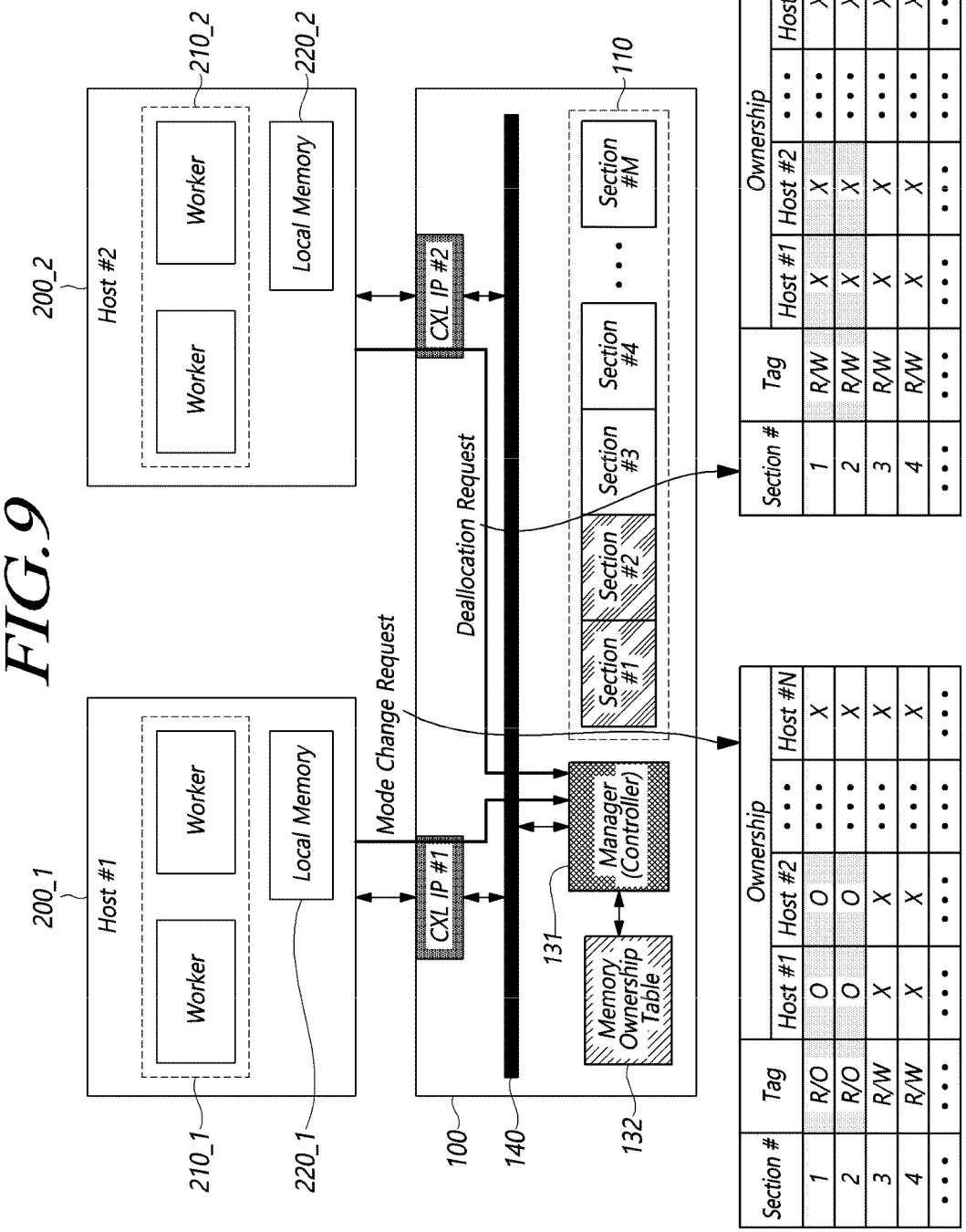

FIGS. 8 and 9 are diagrams illustrating another example method of using memory regions included in a data storage device 100 implemented based on an embodiment of the disclosed technology as shared memory regions.

Referring to FIG. 8, in one example, the memory regions of a memory device 110 included in the data storage device 100 are used as shared memory regions by a first host device 200_1 and a second host device 200_2.

The first host device 200_1 may include at least one first core processor 210_1 and a first local memory 220_1. The second host device 200_2 may include at least one second core processor 210_2 and a second local memory 220_2.

The first local memory 220_1 and the second local memory 220_2 may be volatile memory devices, but the disclosed technology is not limited thereto.

The first host device 200_1 and the second host device 200_2 may distribute and process tasks. When the first host device 200_1 is a writer host, the first host device 200_1 may transmit data required according to performing of the work to the second host device 200_2 through the first local memory 220_1. In this case, the operational performance of a host system may degrade due to data transmission and reception between the first host device 200_1 and the second host device 200_2.

The first host device 200_1 may use some of the memory regions included in the data storage device 100 as shared memory regions to provide data required to be transferred to the second host device 200_2.

Similar to the aforementioned example, the first host device 200_1 may request a controller 131 of the data storage device 100 to allocate memory regions, and may write data to allocated memory regions. For example, the first host device 200_1 may be allocated memory regions #1 and #2.

While a writing operations by the first host device 200_1 is being performed, the memory regions #1 and #2 are allocated only to the first host device 200_1, and the access modes of the memory regions #1 and #2 may be the first mode in which read and write are possible.

When writing of data to the memory regions #1 and #2 is completed, the first host device 200_1 may transmit a mode change request to the controller 131 of the data storage device 100 (①). The first host device 200_1 may transmit reader node information to the controller 131, and the reader node information may include information on the second host device 200_2.

The first host device 200_1 may transmit a shared region access request to the second host device 200_2, which is a reader node (②).

Since the first host device 200_1 transmits the shared region access request to the second host device 200_2, which is the reader node, along with the mode change request, the controller 131 of the data storage device 100 may not transmit an interrupt signal to the second host device 200_2. The controller 131 of the data storage device 100 may perform only an operation according to a request or a command received from the first host device 200_1 or the second host device 200_2.

When receiving the shared region access request from the first host device 200_1, the second host device 200_2 may transmit an allocation request to the controller 131 of the data storage device 100 (③). The second host device 200_2 may transmit a read command to the controller 131 of the data storage device 100 (④).

In some implementations, when receiving the mode change request and the reader node information from the first host device 200_1, the controller 131 may change the access modes of the memory regions #1 and #2 to the second mode, in which only read is possible, and allocate the memory regions #1 and #2 to the second host device 200_2. In this case, when receiving the shared region access request from the first host device 200_1, the second host device 200_2 may transmit a read command to the controller 131 of the data storage device 100 to read data stored in the memory regions #1 and #2.

Since the shared region access request is transmitted by the first host device 200_1 while reducing data transmission and reception between the first host device 200_1 and the second host device 200_2, the controller 131 of the data storage device 100 may manage only the allocation information and access mode information of memory regions, and may perform only processing according to a request or a command of the host device 200.

The above example describes a case where the first host device 200_1, which is a writer host, is deallocated when the access modes of memory regions are changed. However, in some implementations, allocation of the writer host may be changed according to a request or a command of a reader node.

For example, referring to FIG. 9, when data writing to the memory regions #1 and #2, which are shared memory regions, is completed by the first host device 200_1, which is the writer host, the first host device 200_1 may transmit a mode change request to the data storage device 100. The controller 131 of the data storage device 100 may change the access modes of the memory regions #1 and #2 from the first mode to the second mode, in which only read is possible.

The first host device 200_1 may transmit reader node information to the data storage device 100. The controller 131 of the data storage device 100 may allocate the memory regions #1 and #2 to the second host device 200_2 according to the reader node information.

The controller 131 of the data storage device 100 may maintain allocation of the memory regions #1 and #2 to the first host device 200_1, which is the writer host, without deallocating the memory regions #1 and #2. The memory regions #1 and #2 may remain allocated to the first host device 200_1.

When data reading of the memory regions #1 and #2 is completed by the second host device 200_2, the second host device 200_2 may transmit a deallocation request to the data storage device 100. When receiving the deallocation request of the second host device 200_2, the controller 131 of the data storage device 100 may deallocate the memory regions #1 and #2 for the second host device 200_2.

When receiving the deallocation request of the second host device 200_2, In some implementations, the controller 131 of the data storage device 100 may transmit a signal indicating reception of the deallocation request to the first host device 200_1. The controller 131 may receive a deallocation request from the first host device 200_1, which receives the corresponding signal, and according to the deallocation request received from the first host device 200_1, may deallocate the memory regions #1 and #2 for the first host device 200_1. When both the memory regions #1 and #2 are deallocated, the controller 131 may change the access modes of the memory regions #1 and #2 from the second mode to the first mode.

As discussed above, the method of managing the allocation information and access mode information of the memory regions included in the memory device 110 by the controller 131 of the data storage device 100 may vary.

Through management of allocation information and access mode information of memory regions by the controller 131 of the data storage device 100, data directly transmitted and received between the plurality of host devices 200 may be reduced, and data sharing by the data storage device 100 may be easily performed.

Only a few embodiments and examples are described. Enhancements and variations of the disclosed embodiments and other embodiments can be made based on what is described and illustrated in this patent document.

What is claimed is:

1. A data storage system comprising:
    one or more memory devices, each memory device including a plurality of memory regions; and
    a controller coupled in communication with the one or more memory devices and configured to control at least one of the one or more memory devices,
    wherein the controller is configured to:
    set an access mode for a first memory region of the plurality of memory regions;
    allocate the first memory region of the plurality of memory regions as a shared memory region to be accessed by, and in response to allocation requests of, a plurality of host devices that are outside the data storage system; and
    change the access mode of the first memory region allocated as the shared memory region in response to an access mode change request from a first host device among the plurality of host devices, and allocate the shared memory region to a second host device that is among the plurality of host devices and is different from the first host device.

2. The data storage system according to claim 1, wherein the controller is configured to:
    change the access mode of the first memory region allocated as the shared memory region from a first mode to a second mode in response to the access mode change request from the first host device for the access mode of the shared memory region; and
    change the access mode of the first memory region allocated as the shared memory region from the second mode to the first mode in response to a deallocation request from the second host device.

3. The data storage system according to claim 2, wherein the controller receives, from the first host device, reader node information including information on the second host device.

4. The data storage system according to claim 3, wherein, the controller transmits an interrupt signal to the second host device in response to receipt of the reader node information from the first host device.

5. The data storage system according to claim 4, wherein the controller receives an allocation request of the second host device corresponding to the interrupt signal, and allocates the shared memory region to the second host device based on the reader node information.

6. The data storage system according to claim 5, wherein in a case where there are two or more second host devices, the controller changes the access mode of the first memory region allocated as the shared memory region to the first mode upon receiving the deallocation request from all of the two or more second host devices.

7. The data storage system according to claim 3, wherein, upon changing the access mode of the first memory region allocated as the shared memory region to the second mode, the controller allocates the shared memory region to the second host device.

8. The data storage system according to claim 2, wherein, upon receiving the allocation request of the first host device before receiving the access mode change request from the first host device, the controller sets the shared memory region to the first mode and allocates the shared memory region to the first host device.

9. The data storage system according to claim 2, wherein the controller: writes data to the shared memory region in response to a write request from the first host device included in the access mode change request; and upon completion of writing of the data, changes the access mode of the first memory region allocated as the shared memory region to the second mode.

10. The data storage system according to claim 2, wherein, upon changing the access mode of the first memory region allocated as the shared memory region to the second mode, the controller deallocates the first memory region allocated as the shared memory region for the first host device.

11. The data storage system according to claim 2, wherein, upon changing the access mode of the first memory region allocated as the shared memory region to the first mode, the controller deallocates the first memory region allocated as the shared memory region for the first host device.

12. The data storage system according to claim 2, wherein the controller deallocates the first memory region allocated as the shared memory region for the first host device based on the deallocation request of the first host device.

13. The data storage system according to claim 2, wherein, in a case that the access mode of the first memory region allocated as the shared memory region is the second mode, the controller allocates the shared memory region to the second host device.

14. A controller unit for data storage in one or more memory devices, comprising:
an auxiliary memory configured to store allocation information and access mode information associated with a plurality of memory regions included in at least one memory device; and
a controller configured to: change, in response to an access mode change request from a first host device outside the memory device in accessing the memory device, an access mode of a first memory region of the plurality of memory regions that is allocated to the first host device from a first mode to a second mode; and change, in response to a deallocation request from a second host device different from the first host device, the access mode of the first memory region from the second mode to the first mode.

15. The controller unit according to claim 14, wherein the controller: receives, from the first host device, reader node information including information on the second host device; and upon receiving the reader node information, transmits an interrupt signal to the second host device.

16. The controller unit according to claim 15, wherein the controller allocates, upon receiving the reader node information, the first memory region to the second host device.

17. The controller unit according to claim 16, wherein, upon receiving the deallocation request from all of at least two second host devices, the controller changes the access mode of the first memory region to the first mode.

18. A computing system comprising:
a first host device;
a second host device; and
a data storage device structured to include memory regions for storing data and configured to be in communication with the first host device and second host device so that the first host device and the second host device can access the data storage device,
wherein the first host device is configured to: transmit an allocation request to the data storage device; write data to a shared memory region allocated according to the allocation request; and transmit an access mode change request for changing an access mode of the shared memory region to the data storage device, and
wherein the data storage device changes the access mode of the shared memory region from a first mode to a second mode in response to the access mode change request, and allocates the shared memory region to the second host device.

19. The computing system according to claim 18, wherein the first host device transmits the access mode change request to the data storage device, and transmits a shared region access request to the second host device, and
the second host device transmits, upon receiving the shared region access request, an allocation request for the first memory region to the data storage device.

20. The computing system according to claim 18, wherein, upon receiving a deallocation request for the first memory region from the second host device, the data storage device deallocates the first memory region for the second host device, and changes the access mode of the first memory region from the second mode to the first mode.

* * * * *